July 30, 1940. W. D. NICHOLS 2,209,927

DRY BATTERY CONSTRUCTION

Filed April 20, 1937

INVENTOR.
WILLIAM D. NICHOLS
BY
ATTORNEYS.

Patented July 30, 1940

2,209,927

UNITED STATES PATENT OFFICE 2,209,927

DRY BATTERY CONSTRUCTION

William D. Nichols, Fairview Village, Ohio, assignor to National Carbon Company, Inc., a corporation of New York Application April 20, 1937, Serial No. 137,898

14 Claims. (Cl. 136—108)

This invention relates to electric batteries, and in particular to a dry battery construction of the multi-cell type, in which a plurality of cell units are assembled and interconnected in fixed relation. Included also in the invention is the process of assembling such a battery structure.

Prior multi-cell dry batteries have consisted generally of a box-shaped paper or cardboard nest into which the desired number of cell units are introduced in compact arrangement and separated from each other by insulating, and preferably water-proofed, partitions. In one form, each cylindrical cell is inserted into an insulating paper tube conforming closely to the cell periphery and providing an individual cylindrical compartment for each cell. Egg crate-type partitions have also been used, which provide a plurality of rectangular cell compartments. With either partitioning arrangement the cell bottoms are often insulated by means of a water-proofed liner covering the bottom of the nest or container. After inserting each unit into its individual compartment, inter-cell electrical circuit is made by means of soldered wire connections, and the nest is then usually completely filled with a thermoplastic material, comprising pitch, asphaltum, or other battery sealing compound. The solidified seal serves in some instances to seal the individual cells, it fills the voids between the units, provides additional anchorage for each cell, and produces the necessary rigidity and strength to the assembly, which would be otherwise lacking merely from the support afforded by the flexible walls of the paper or cardboard nest.

In such former battery structures special nests and large quantities of sealing material are essential to obtain a rigid and strong assembly, which considerably increases the weight and cost of the battery, as well as the expense of handling and shipping it. In pouring the seal on the top of the assembly an uneven flow of the sealing material, particularly about the cell bottoms, is often encountered and difficult to control. Thus electrolyte leakage from one cell may spread to others, causing a short circuit with resulting loss in battery efficiency. Moisture-proofed bottom liners in the nest may insulate against moisture contact with the cell bottoms, but they will not prevent creepage of electrolyte. The egg crate type partitions have slotted interfitting portions which leave openings between adjacent compartments and require further care in sealing, with excessive quantities of sealing compound, to effectively prevent inter-cell contact of leaking electrolyte.

The principal objects of this invention are: to provide a battery construction in which the above and other common faults of prior batteries are reduced to a minimum; to provide improved insulation for the individual cell units, complete prevention of inter-cell contact by leakage electrolyte, and a strong and rigid assembly with comparatively small quantities of heavy sealing compound; and to improve the method of assembly whereby a more economical and efficient handling results during both manufacture and shipment of the product. These and other advantages of the invention will be evident from a description of the accompanying drawing showing certain preferred embodiments of the invention, and in which—

Figure 1:
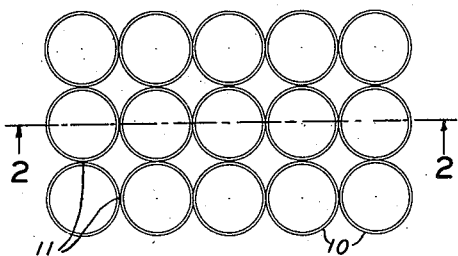
Figure 1 is a top plan view of a preferred partition structure.
Figure 2:
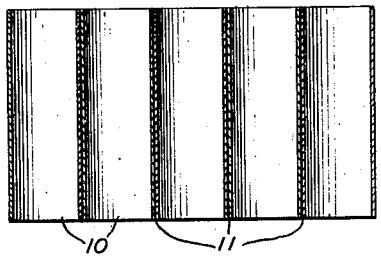
Figure 2 is section on the line 2—2 of Figure 1.

As represented by Figures 1 and 2, there is first provided an integral or unitary honeycomb partition structure comprising a plurality of separately formed cylindrical tubes 10 of equal height and arranged side by side with their axes parallel. Each tube is of a diameter adapted to conform closely to a cell unit 12 and form an individual jacket or compartment therefor. A strong rigid assembly is produced by applying separate layers or strips 11 of glue, cement or other adhesive material to the outside surfaces of each tube only along the lines or areas where it contacts tangentially with adjoining tubes, and pressing such coated portions of adjoining tubes together to cause them to firmly adhere to each other. Each tube is preferably composed of lapped or spirally wound multi-ply paper which has been treated to moisture-proof it, by saturating the inner ply with paraffine, scalewax, or other moisture-resistant material, and the inner and outer plies of the paper preferably are cemented together with a layer of asphaltum. Thus, each dry cell is in an insulating compartment which is impermeable to moisture and unsusceptible to electrolyte saturation. The two or more supporting and securing layers or joints 11 which extend longitudinally of each tube provide a unitary and exceptionally strong partition structure for the complete battery.

Figure 3:
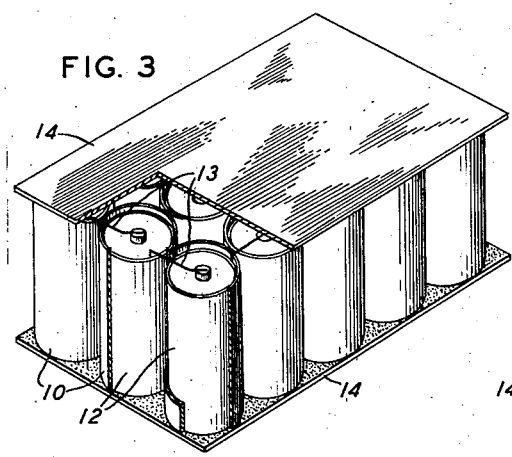
Figures 3, 4 and 5 show, in partially broken perspective, three embodiments of a substantially complete battery assembly.
Figure 4:
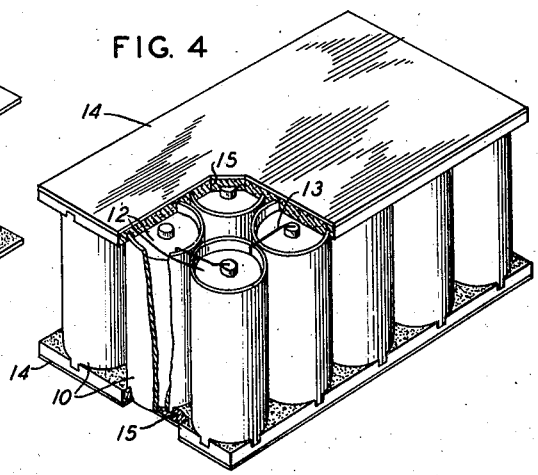
Figure 5:
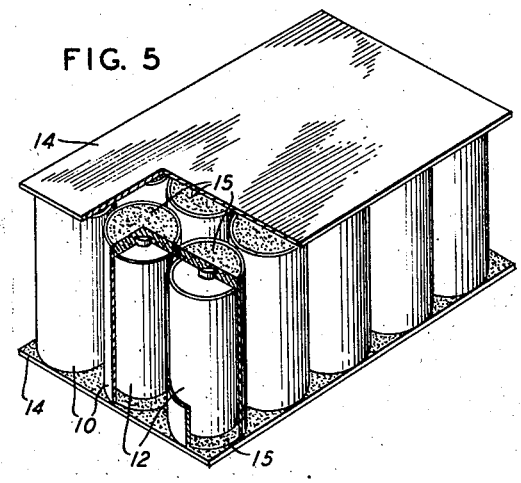

In Figures 3, 4 and 5 modifications in further assembly of the complete battery are illustrated, showing in each insulating tube 10 an upright dry cell 12, said cells being connected in the electrical circuit desired through the soldered wire connections 13. Separate top and bottom cover sheets or plates 14, of relatively stiff material such as cardboard or heavy paper, are applied to the assembly, and permanently set in place through adherence to the top and bottom of the partition structure. These plates are also preferably moisture-proofed, and provide additional cell protection and further strength and stability to the complete unit. Various means may be employed for applying and securing these cover plates in sealing relation to the partition structure, but three especially suitable embodiments are illustrated in the drawing.

Where only a limited cell protection is essential or desirable, a ready and simple manner of incorporating the plates 14 is to attach them by means of glue, cement or other adhesive to the end edges of the tube structure, as shown in Figure 3. Here, the tubes are of substantially the same length as the individual cells, the plates fit closely against the cell ends and directly adhere to all edges of the insulating tube structure. No thermoplastic sealing compound is used other than that which may be employed to seal the individual cell units.

In Figure 4 the inner surfaces of the top and bottom plates 14 carry a heavy coating 15 of a thermoplastic material or the usual battery sealing compound. The insulating tubes in this structure are somewhat longer than the individual cells and are completely embedded at both ends in the seal compound so that the latter projects into the tubes to hold the cells in place and insulate them at the top and bottom. The plates 14 may be set in position one at a time, by first pressing the tubular partition structure into the softened seal on the lower plate until the tube ends are well embedded, and then pressing on the top plate in similar manner, after the individual cells have been inserted and properly interconnected. In another alternative, after the lower plate has been set and the seal hardened, the dry cells are inserted and electrically connected, and the upper extending end of each insulating tube 10 is filled with a molten sealing compound to a level sufficient to adhere firmly with the top cover plate, which is then applied under pressure without a previous seal coating. To facilitate handling, the lower plate in this structure may be provided with short vertical side walls resembling a tray to retain a more fluid sealing compound during embedding and setting of the tube partition structure. The top plate is then applied in either manner, as described above.

In the further embodiment of Figure 5 the plates 14 are applied to the assembly without a prior seal coating, and the seal 15 is used only in amounts sufficient to fill the empty ends of each tube portion, such tubes being longer than the cells so as to extend both above and below them. Both cover plates are pressed against the ends of the tubes and held permanently in position by adherence to the seal compound therein. To properly position the individual cells within their respective insulating tubes, the partition structure may be placed on a form comprising a flat surface with studs thereon of sufficient height and position to obtain the proper cell location with a projecting tube portion at both ends. The top open ends of the tubes are then filled with molten sealing compound, the upper cover plate is applied, and the assembly turned over t repeat this operation in applying the other cov plate.

Figure 6:
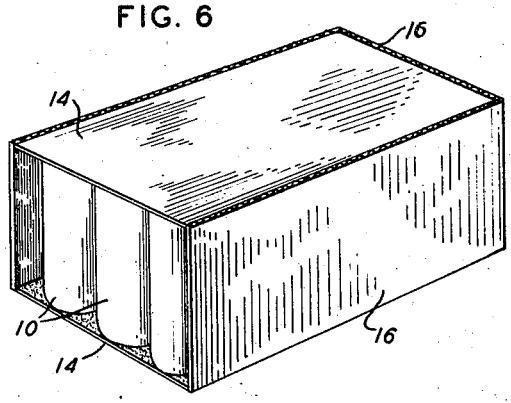
Figure 6 is a perspective view showing further encasing means for the outer cell units.

The assembly, completed as described, may be packaged in any desired manner for shipment. Preferably an additional protection or reinforcement is provided for the outside and corner cell units. As shown in Figure 6, this reinforcement may consist of a U shaped liner 16 fitting about two sides and one end of the assembly in contact with the plates 14. A completely surrounding sleeve, fitted in similar manner, may also be used for this purpose.

Since the spaces or voids left between and adjoining the cell compartments are not filled with sealing composition, there is a materal reduction in the use of heavy sealing compound, which provides a much lighter battery and affords substantial economies both in manufacture and commercial handling and use. These important advantages are obtained with no sacrifice in strength and rigidity of the battery, and the insulation and prevention of electrolyte creepage are greatly improved over prior structures. The unitary and rigid partition structure contributes efficiency in assembling operations, by eliminating the need of intermediate forms and support members during seal pouring and other manufacturing steps. The outer container box, inner nest linings, and other expensive features of former battery structures are also eliminated, and the weight and dimensions of the complete assembly may be held closer to a minimum for the number of cell units used.

It will be evident that certain features of the invention may be used without others, and that the batteries shown in the drawing, as well as the process of assembling the batteries, may be modified in a number of ways, without departing from the broad principles of the invention.

What is claimed is:

1. An electric battery comprising a plurality of tubes of insulating material disposed side by side and of substantially equal height; a plurality of separate joints of adhesive material extending longitudinally of each tube and securing each tube to those adjoining it; a dry cell in each of said tubes; means electrically connecting the cells in circuit relation; a sheet of insulating material secured to and closing all of the ends of said tubes in one plane; and another sheet of insulating material secured to and closing all of the other ends of said tubes.

2. An electric battery as claimed in claim 1, in which said tubes are cylindrical and are secured to one another by strips of adhesive material extending only along the adjoining portions of the cylindrical surfaces of adjoining tubes.

3. An electric battery as claimed in claim 1, in which said sheets are permanently secured to the respective ends of said tubes by adhesive sealing material.

4. An electric battery as claimed in claim 1, in which said sheets consist of moisture-proofed paper, cardboard or the like.

5. An electric battery as claimed in claim 1, in which at least one of said sheets is permanently secured and sealed to said tubes by a layer of thermoplastic sealing compound adhering to the inner face of said sheet, and the adjacent ends of said tubes are embedded in said layer.

6. An electric battery as claimed in claim 1, in which at least one of said sheets is permanently secured and sealed to said tubes by a thermoplastic sealing compound extending into the adjacent ends of said tubes.

7. An electric battery comprising a plurality of moisture-proofed cylindrical paper tubes of substantially equal height and disposed side by side with their axes parallel to one another to provide a plurality of dry cell compartments; strips of adhesive material securing adjoining tubes to one another; a dry cell positioned upright in each of said tubes; means connecting such cells in electrical circuit with one another; a sheet of moisture-proofed paper covering all of the bottom ends of said tubes; another sheet of moisture-proofed paper covering all of the top ends of said tubes; and layers of adhesive sealing material adhering to the inner faces of said sheets and securing and sealing the latter to the respective ends of said tubes, such tube ends being embedded in said layers.

8. An electric battery comprising a plurality of moisture-proofed cylindrical paper tubes of substantially equal height and disposed side by side with their axes parallel to one another to provide a plurality of dry cell compartments; strips of adhesive material securing adjoining tubes to one another; a dry cell positioned upright in each of said tubes and spaced from the ends thereof; means connecting such cells in electrical circuit with one another; a sheet of moisture-proofed paper covering all of the bottom ends of said tubes; another sheet of moisture-proofed paper covering all of the top ends of said tubes; and adhesive sealing material confined within the ends of said tubes adjacent said sheets and securing and sealing the latter in position.

9. A container for a multi-cell electric battery comprising a plurality of tubes of insulating material disposed side by side and of equal height, adjoining tubes being secured to one another into a unitary structure by a plurality of separate joints of adhesive material extending longitudinally of each tube, each tube being adapted to receive a dry cell; and imperforate sheets of insulating material adapted to be secured to the top and bottom ends of said tubes to permanently close said ends.

10. A container for a multi-cell electric battery, as claimed in claim 9, in which said tubes are cylindrical and consist of moisture-proofed paper; and said imperforate sheets consist of moisture-proofed paper, cardboard or the like.

11. A process of making a multi-cell dry battery which comprises forming a unitary container for a plurality of cells by disposing in side-by-side relation a plurality of insulating tubes of equal height and securing said tubes together by joints of adhesive material extending lengthwise of the adjoining surfaces of said tubes; inserting a dry cell into each of said tubes after the formation of said unitary container; electrically connecting such cells in circuit with one another; and securing insulating sheets to the opposite ends of said tubes to close said tubes at both ends thereof.

12. A process of making a multi-cell dry battery as claimed in claim 11, in which one of said insulating sheets is secured to the tube ends at one side of said container to close these tube ends before the dry cells are inserted in the tubes and electrically connected to one another; and thereafter another of said insulating sheets is secured to the other ends of said tubes to close said other ends.

13. A process of making a multi-cell dry battery as claimed in claim 11, in which each of said insulating sheets has a surface coated with a layer of adherent sealing composition and said sheets are so applied to said container that the ends of said tubes are embedded in and sealed by such composition.

14. A process of making a multi-cell dry battery as claimed in claim 11, in which each of said insulating tubes is cylindrical, and such joints of adhesive material extend only along tangentially adjoining surfaces of said tubes, to leave voids between the tubes of each group of four tubes; and in which each of said insulating sheets is of sufficient area to cover all of the tube ends at one side of said container, each sheet has one surface thereof coated with a layer of adherent sealing composition, and said sheets are severally so applied to said container that the ends of said tubes are embedded in and sealed by such composition and said voids remain substantially unfilled with sealing composition.

WILLIAM D. NICHOLS.